Nov. 26, 1963   S. PRIGOZY   3,111,845
PICK-OFF TRANSFORMER FOR MEASURING DIELECTRIC MATERIAL
Filed Oct. 15, 1958   4 Sheets-Sheet 1

INVENTOR
STEPHEN PRIGOZY
BY
Byerly, Townsend, Watson & Churchill
ATTORNEYS.

INVENTOR
STEPHEN PRIGOZY
BY
Byerly, Townsend, Watson & Churchill
ATTORNEYS.

Nov. 26, 1963     S. PRIGOZY     3,111,845
PICK-OFF TRANSFORMER FOR MEASURING DIELECTRIC MATERIAL
Filed Oct. 15, 1958     4 Sheets-Sheet 3

INVENTOR
STEPHEN PRIGOZY
BY
Byerly, Townsend, Watson & Churchill
ATTORNEYS.

Nov. 26, 1963 S. PRIGOZY 3,111,845
PICK-OFF TRANSFORMER FOR MEASURING DIELECTRIC MATERIAL
Filed Oct. 15, 1958 4 Sheets-Sheet 4

INVENTOR
STEPHEN PRIGOZY
BY
Byerly, Townsend, Watson & Churchill
ATTORNEYS.

United States Patent Office 3,111,845
Patented Nov. 26, 1963

3,111,845
PICK-OFF TRANSFORMER FOR MEASURING
DIELECTRIC MATERIAL
Stephen Prigozy, New York, N.Y., assignor to Simmonds
Precision Products, Inc., a corporation of New York
Filed Oct. 15, 1958, Ser. No. 767,361
20 Claims. (Cl. 73—304)

This invention relates to a method and apparatus for measuring dielectric material and, in particular, relates to a continuously rebalancing bridge employing a transducer such as a capacitor type liquid measuring device for measuring and indicating the quantity of liquid fuel in a fuel tank and is especially useful in aircraft.

As known in the art, the continuously rebalancing measuring bridge generally employs a capacitor measuring device arranged with its capacitor electrodes vertically in the fuel tank. The level of the fuel between the capacitor electrodes depends upon the fuel level in the fuel tank. The capacitor is designed so that its capacitance is a function of the dielectric constant of the material between its spaced electrodes and also the height of the fuel level. Accordingly, its capacitance will change with a change of fuel level. The bridge is adapted to compare a reference signal with the measuring signal furnished by the measuring capacitor wherein a resultant signal proportional to the difference of the two is amplified and then caused to operate a motor which will restore the bridge to balance. The degree of correction required to restore the bridge to balance is an indication of the capacitance of the transducer and thus a reflection of the quantity of fuel in the fuel tank. In a compensated type of bridge measuring system, a second capacitor is mounted in the fuel tank so that it is at all times immersed in the fuel. The compensating capacitor is arranged in the bridge circuit to compensate for differences in bridge measurements that may otherwise arise by reason of the fact that the density and dielectric constant of fuels vary disproportionately.

Oftentimes and particularly in aircraft, duplicated indications of fuel quantity are desirable at various locations in the aircraft. Heretofore, this may have been achieved by providing separate and complete bridge measuring systems with independent calibrated indicators at the various locations where duplicated readings are desired. Since each bridge is per se complete, the bridge will have its individual capacitor type measuring device or combination of such devices for the compensated bridge. This is not entirely satisfactory because of a multiplicity of such capacitors in each fuel tank and because of the relative expense of the capacitor type device which must be designed and fabricated with great care.

It is the principal object of the instant invention to provide means for duplicating measuring signals while employing only a single dielectric measuring transducer, such as a capacitor unit or single set of such units for a compensated bridge which invention provides a duplicate measuring signal capable of being used for a multiplicity of functions.

It is a further object of the instant invention to employ a signal pick-off transformer having its primary winding conductively in series with a capacitor measuring transducer. The transformer design contemplates a low loss core of high permeability material and low coercive force design wherein the bridge parameters are such that the load impedance of a transformer secondary is low with respect to the high impedance of the transducer furnishing the signal to be duplicated. By choosing a 1:1 turn ratio, the duplicated signal induced in the transformer secondary is substantially identical to the measuring signal furnished by the transducer.

The foregoing arrangement has a number of applications in fuel measuring systems. For example, by employing the transformer to duplicate the measuring signal to a compensated bridge, a repeater indicating bridge may be provided at any desirable location in the aircraft without the need of an additional measuring capacitor or set of same. As another example, the invention permits a plurality of measuring capacitors to be operationally combined in a signal measuring bridge or in individual measuring bridges to provide simultaneously a totalizing measurement and individual tank measurements. Moreover, the invention is also applicable to a center-of-gravity measuring system.

As a further object, the invention contemplates a method and apparatus for converting a two-wire capacitor type measuring system to appear electrically as a three-wire capacitor type measuring system without the need of discarding the already installed two-wire capacitor.

Further objects and advantages will become apparent from the following description of the invention taken in conjunction with the figures, in which:

FIGS. 8 through 10a illustrate the practice of the invention for the purpose of converting a two-wire capacitor type measuring bridge to the electrical equivalent of a three-wire capacitor measuring bridge wherein, FIG. 8 illustrates schematically the two-wire capacitor; FIG. 8a illustrates schematically the electrical load seen by the bridge detector employing such capacitor; FIG. 9 shows schematically the three-wire capacitor; FIG. 9a shows schematically the electrical load seen by the bridge detector.

Figure 1:
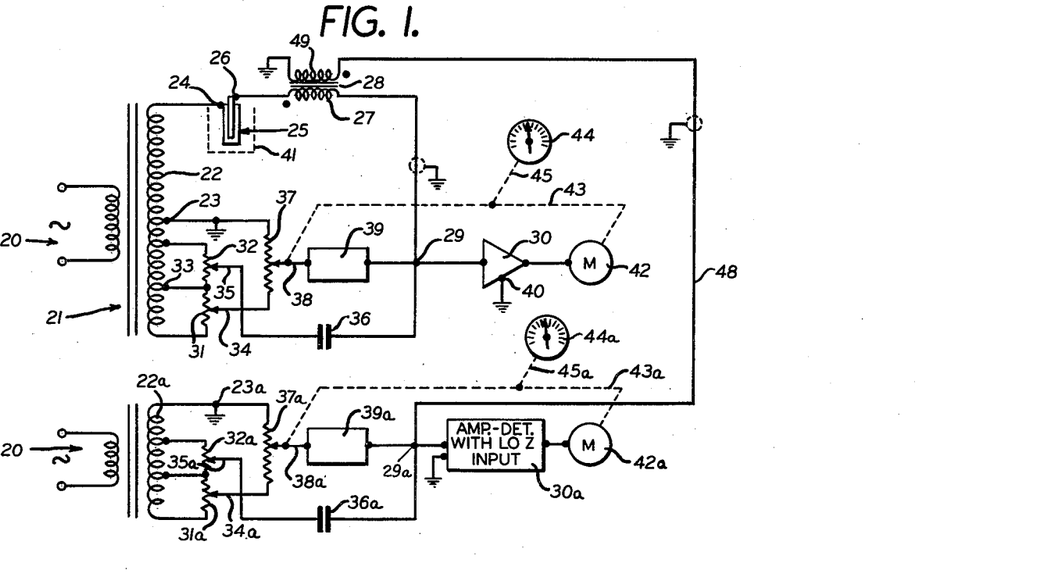
FIG. 1 is a schematic diagram of a continuously rebalancing capacitor type measuring bridge; the bridge is adapted to measure the quantity of fuel in a fuel tank and includes a repeater bridge operationally tied to the main bridge by a pick-off transformer in accordance with the practice of the invention.

Reference is now made to the figures and in particular FIG. 1 which illustrates one preferred embodiment of the invention. An alternating voltage of suitable frequency, for example 400 cycles, is supplied by a source 20 to a transformer 21. The secondary winding 22 of transformer 21 is grounded at its center tap 23. One side of secondary winding 22 is connected to an electrode 24 of a capacitor type measuring transducer 25. The other electrode 26 of capacitor 25 is conductively in series with a primary winding 27 of a transformer 28. The other side of winding 27 is connected by a shielded line to an input terminal junction 29 of a current sensing amplifier 30. A potentiometer 31 is connected across the lower portion of the other side of secondary winding 22. A second potentiometer 32 is connected across the midportion of the lower side of secondary winding 22 wherein adjacent ends of potentiometers 31, 32 are conductively connected to a secondary tap 33. Potentiometers 31, 32 have movable slide arms 34, 35, respectively, wherein arm 35 is connected to one side of a capacitor 36 the other side of which is connected to input terminal 29. A potentiometer 37 is connected from ground 23 to arm 34. Potentiometer 37 has a movable slide arm 38 connected to one side of an impedance 39 the other side of which is connected to input terminal 29. The other input terminal 40 of amplifier 30 is grounded. Assuming for the moment that transformer 28 is not present in the foregoing described bridge circuit, that is to say, electrode 26 is conductively connected directly to input terminal 29, the resulting bridge circuit is one used for measuring and indicating the quantity of dielectric fluid in a container 41, for example the quantity of fuel in an aircraft fuel tank.

As understood in the art, measuring capacitor 25 includes spaced electrodes 24, 26 positioned in tank 41 whereby the fuel fills the space between electrodes 24, 26 to an extent depending upon its tank level. The capacitance of measuring condenser 25 depends upon the height of the dielectric fuel between its electrodes and its dielectric constant. In an aircraft measuring system, the fuel has a dielectric constant of approximately 2, air has a dielectric constant of 1, hence, if the entire height of the space between electrodes 24, 26 is filled with fuel, the capacitance of the condenser 25 will be approximately twice its empty tank value. As fuel is consumed, its height between the electrodes 24, 26 drops and air enters the top space between the electrodes and thus causes the capacitance of measuring condenser 25 to decrease accordingly.

Consequently, measuring capacitor 25 may be employed in the bridge circuit to reflect the quantity of fuel in the aircraft fuel tank. To accomplish this, measuring capacitor 25 is designed to follow a predetermined capacitance-length law or curve so characterized wherein the capacitance of condenser 25 is proportionately related to the volume of fuel in fuel tank 41, and wherein incremental changes of said capacitance is proportionately related to incremental changes of fuel volume and thus the quantity of fuel in fuel tank 41.

The signal from the measuring bridge (without pickoff transformer 28 and its associated repeater circuit) is fed to amplifier 30, which signal is essentially the resultant of the current through capacitor 25 summed with the currents through the reference impedances in the lower portion of secondary 22. The reference impedances include capacitor 36 and impedance 39. It will be seen that impedance 39 is substantially a capacitive reactance. Since the current through measuring capacitor 25 is of opposite phase with respect to the currents through the reference impedances, the resultant input signal to amplifier 30 will be substantially zero when the measuring bridge is balanced. If after the bridge is balanced, the capacitance of measuring capacitor 25 changes in response to a change of fuel quantity in fuel tank 41, the bridge will no longer balance and a current signal will be applied to amplifier 30. The unbalanced input signal applied to amplifier 30 will be either in phase or 180 degrees out of phase with respect to source 20, depending entirely whether the capacitance of measuring capacitor 25 increases or decreases in comparison to the capacitance of the reference impedances.

The amplified signal from amplifier 30 is applied to a winding of a two-phase induction motor as known in the art, hence, shown schematically herein as 42. The other winding of motor 42 is energized by voltage source 20. Motor 42 will turn either clockwise or counter clockwise depending upon the phase relationship between source 20 and the input signal to amplifier 30. Arm 38 is mechanically linked to the motor shaft as depicted by broken line 43 to regulate potentiometer 37 in a direction to return the bridge to balance and thus re-establish a zero input signal to amplifier 30. A dial indicator 44, also mechanically responsive to motor shaft turning as depicted by broken line 45, may be suitably calibrated to indicate the quantity being measured in the tank 41, since change of capacitance of measuring capacitor 25 is occasioned by the addition or draining of fuel in the tank 41.

In adjusting the bridge for operation, capacitor 36 functions as an empty tank reference capacitor and its current may be controlled by potentiometer arm 35 for balancing the bridge circuit for the empty tank condition. In the illustrated and preferred embodiment, the value of capacitor 36 is substantially equal to the empty tank capacitance of measuring capacitor 25. Slide arm 34 may be employed to regulate potentiometer 31 for the purpose of adjusting the current through reference impedance 39 when balancing the bridge for the full tank condition. Accordingly, the aforesaid fuel measuring bridge circuit is a continuously rebalancing bridge in which measuring capacitor 25 is compared to reference capacitors and wherein a signal proportional to the difference between them is amplified to operate motor 42 which restores the bridge to balance. The degree of correction required to restore the bridge circuit to balance is an indication of the capacitance of measuring unit 25 and thus an indication of the quantity of fuel in fuel tank 41.

If the density of the fuel and its dielectric constant are known, the measuring bridge may be employed to measure and indicate with substantial accuracy the weight of the fuel in aircraft tank 41. The range of an aircraft is determined by the energy content of the fuel which is more closely allied to mass rather than volume of the fuel. Thus, a measurement and indication of the weight of fuel in the aircraft tank is more desirable information particularly for jet aircraft. However, the dielectric constant for different temperatures will vary; and in addition, the differences in dielectric constant do not in general vary in the same proportion as variations of the density of the respective fuels, or even for a given fuel at different temperatures. Consequently, the measuring bridge is compensated so that over a wide range of temperatures the bridge may be calibrated to measure and indicate with substantial accuracy the weight of fuel of a predetermined dielectric constant and density relationship and wherein such compensation also will permit accurate measurements and indications of the weight of other fuels having different dielectric constant and density without recalibration.

Compensation is accomplished by a second capacitor 46 with its spaced electrodes immersed in the fuel under measurement whereby the capacitance of capacitor 46 is a function of the fuel dielectric constant. Capacitor 46 will be referred to herein as the compensator capacitor and is supported in fuel tank 41 so that at all times it is immersed in the fuel under measurement. Compensator capacitor 46 has one electrode thereof connected to arm 38 and its other electrode connected to junction 29 and is thus conductively connected to the bridge circuit to neutralize the effect of variations in dielectric constant of the fuel under measurement. A capacitor 47 may be shunted across compensator capacitor 46 and when employed in this fashion, it functions as an additional reference capacitance serving to rebalance at least a portion of the measuring signal from measuring capacitor 25.

Figure 1A:
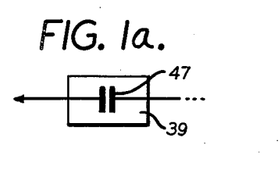
FIGS. 1a and 1b depict various capacitor embodiments making up one of the reference impedances employed in the bridge circuit.
Figure 1B:
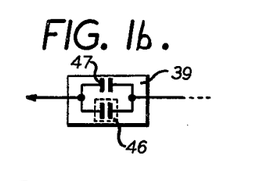

FIG. 1b illustrates the makeup of impedance 39 when both capacitors 46, 47 are used in the reference circuit.

When the makeup of impedance 39 is that depicted in FIG. 1a, then the measuring bridge is not compensated. The reference impedance 39 will consist of reference capacitor 47 and the degree of correction required to restore bridge balance will be proportional to the change of fuel level or dielectric constant in fuel tank 41. It will be understood that the invention is equally applicable to an uncompensated bridge, and if dial 44 is calibrated for a fuel of a known dielectric constant it will indicate volume. The uncompensated bridge can furnish a weight indication if the empirical relationship between the fuel dielectric constant and its density can be established. In the discussion that follows, it will be assumed that the illustrated bridges are compensated.

Figure 2:
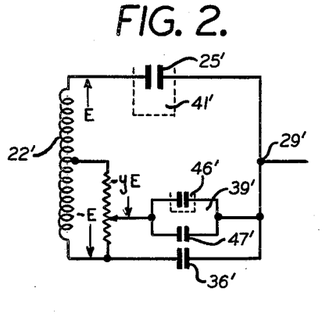
FIG. 2 is a schematic diagram used herein to illustrate the operation of the measuring bridge.

Reference is now made to FIG. 2 which shows schematically an approximate equivalent circuit of the bridge for the purpose of illustrating that the bridge circuit will indicate the weight of fuel in fuel tank 41 when compensated as depicted in FIG. 1b. In referring to FIG. 2, bridge elements illustrated therein and corresponding to similar bridge elements set forth in FIG. 1 are designated by like-numbered reference symbols but primed. The capacitance $C_t$ of measuring capacitor 25' is set forth in Equation 1 wherein K is the dielectric constant of the fuel under measurement; $C_o$ is the empty tank capacitance of measuring capacitor 25'; and V is a number between zero and unity denoting the volumetric proportionate part of tank 41' filled with fuel:

$$C_t = C_o + C_o V(K-1) \quad (1)$$

The capacitance $C_s$ of compensating capacitor 46' is expressed by a similar formula except that V is equalled to 1 since capacitor 46' is always immersed in fuel and wherein $C_e$ is its empty tank capacitance value:

$$C_s = C_e + C_e(K-1) = C_e K \quad (2)$$

$C_r$ is the capacitance of reference capacitance 47' and $C_e$ is the capacitance of the empty reference capacitance 36'. The voltages E, −E across the upper and lower portions of transformer secondary 22' are equal but opposite in phase; y is a number between zero and unity and is proportional to the amount of correction required to restore the bridge to balance. Bridge balance may be expressed by Equation 3, a summation of currents:

$$jwEC_o + jwEVC_o(K-1) = jwEC_e + jwyEC_r + jwyEC_e + jwyEC_e(K-1) \quad (3)$$

Since $C_o$ equals $C_e$ Equation 3 may be written as follows $$VC_o(K-1) = yC_r + yC_e + yC_e(K-1) \quad (4)$$

Solving Equation 4 for y:

$$y = \frac{VC_o(K-1)}{C_r + C_e + C_e(K-1)} = \frac{V(K-1)}{\frac{C_r + C_e}{C_o} + \frac{C_e}{C_o}(K-1)} \quad (5)$$

It has been determined that the density and dielectric constant of fuels have the following relationship often referred to as capacity index where A and B are constants and D denotes fuel density:

$$\frac{K-1}{D} = A + B(K-1) \quad (6)$$

If y, which is an indication of correction to re-establish bridge balance, is also proportional to fuel weight for the compensated circuit, then it should satisfy the following expression where V denotes volume, D denotes density, and W denotes weight:

$$y = W = V \times D \quad (7)$$

Substituting the solution of D from Equation 6 in Equation 7, y equals:

$$y = W = \frac{V(K-1)}{A + B(K-1)} \quad (8)$$

Comparison of Equations 5 and 8 illustrate that upon suitable selection of capacitor parameters to establish values for constants A and B, the amount of correction required to restore bridge to balance, i.e., y, will indicate the weight or mass of fuel in fuel tank 41'.

The invention contemplates duplicating the measuring signal furnished by the immersed capacitor. In the embodiment illustrated in FIG. 1, the duplicated measuring signal is fed to a continuously rebalancing repeater bridge which is adapted to duplicate the weight indication furnished by the main bridge, but at some other desirable or remote location in the aircraft.

Pick-off transformer 28 has its primary winding 27 conductively in series with the upper portion of winding 22. Consequently, the signal current furnished to junction 29 is the primary winding line current. The repeater bridge circuit is substantially a duplication of the master bridge circuit. Elements of the repeater circuit corresponding to correlated master circuit elements are designated by like-numbered symbols but with a suffix a. Repeater circuit has a secondary winding 22a energized by source 20 and grounded at the upper end at 23a. Potentiometers 31a, 32a via sliding arms 34a, 35a are conductively connected, respectively, to potentiometer 37a and capacitor 36a. The other side of potentiometer 37a is grounded. The other side of empty tank reference capacitor 36a is connected to input terminal junction 29a to which the induced measuring signal is fed from the transformer secondary winding 49 over shielded line 48. The reference impedance 39a is also conductively connected to junction 29a. Impedance 39a will include a compensator capacitor as contemplated in FIG. 1b, and the amount of potentiometer correction to re-establish bridge balance will indicate fuel weight. The output of amplifier 30a feeds a two-phase induction motor 42a the shaft of which is mechanically linked to potentiometer arm 38a and dial indicator 44a.

Figure 3:
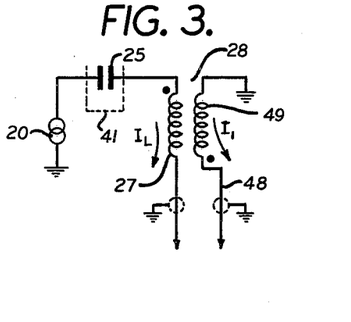
FIG. 3 is a schematic diagram of the pick-off transformer.

In accordance with the invention as employed in the aforesaid embodiment, the induced measuring signal applied to the repeater bridge should substantially equal the measuring signal fed to amplifier 30. FIG. 3 depicts schematically the signal pick-off transformer 28 wherein $I_L$ represents the measuring signal fed to amplifier 30. $I_1$ represents the measuring signal induced in secondary winding 49 and fed to amplifier 30a. The other side of winding 49 is grounded. Amplifier 30a is selected to have a low input impedance compared to the input impedance of the upper portion of the main bridge circuit, that is to say, the impedance in the primary side of transformer 28. Thus, the input impedance of amplifier 30a, reflected to the primary of transformer 28, will not have an appreciable effect on current $I_L$. In the illustrated embodiment amplifier 30a is designed to have an input impedance of approximately 100 ohms, whereas the impedance of measuring condenser 25 is in the order of 4 megohms. Transformer 28 is provided with a low loss core and further characterized by high permeability and low coercive force and close coupling between primary and secondary. Consequently, transformer 28 will draw a small magnetizing current and have a small core loss. As a result, the current required in the primary to balance the secondary load current $I_1$ will be substantially equal to the primary line current $I_L$, and by selecting a 1:1 turns ratio for transformer 28, the induced measuring current $I_1$ will be substantially equal to primary measuring current $I_L$. However it should be understood that the turns ratio need not be 1:1 to practice the invention. If employing some other turns ratio, $I_1$ will be a predetermined or known proportion of $I_L$. Consequently, the repeater bridge circuit will see an induced current or measuring signal equal or proportional to the signal seen by the main bridge circuit. One end of secondary winding 49 is grounded. The transformer windings are wound so that the polarity of $I_1$ is 180 degrees out of phase with respect to the polarity of the reference signals fed to amplifier 30a from impedances 39a and 36a. Upon applying induced measuring signal $I_1$ to amplifier 30a, the continuously rebalancing repeater bridge will measure and indicate fluid weight in the same manner as the main bridge. Amplifier 30a may be transistorized which adds the further advantage of being compact and light in weight.

A reasonable number of pick-off transformers, each feeding a responsive repeater bridge, may be connected conductively in series with transducer 25 to provide respective induced measuring signals if desired. The only restriction is that the impedance of the various repeater bridge circuits of each pick-off transformer should be sufficiently low so as not to load adversely the main bridge circuit.

Figure 4:
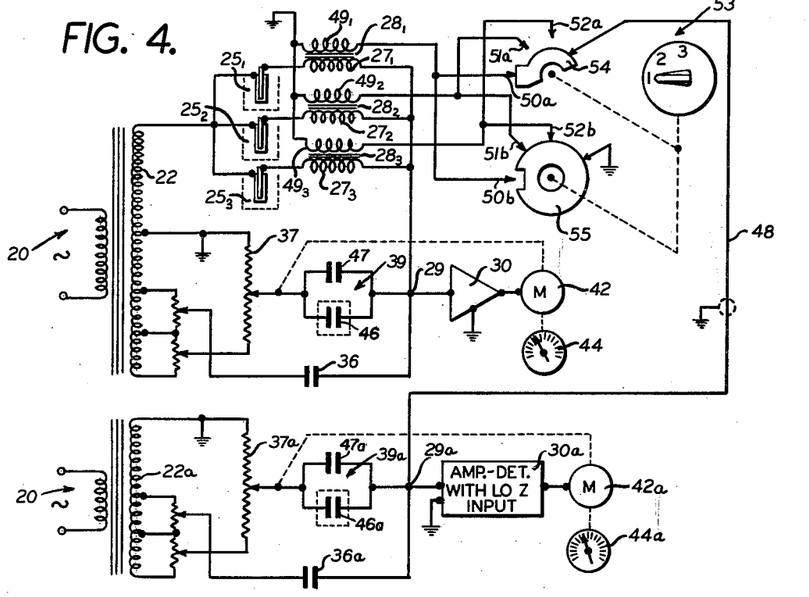
FIG. 4 is a schematic diagram showing the application of the invention in a measuring bridge incorporating a plurality of measuring capacitors each for measuring fuel in individual fuel tanks; the bridge serves as a totalizer whereas a second bridge operationally tied in with the totalizer bridge provides measurements of the individual tanks.
Figure 5:
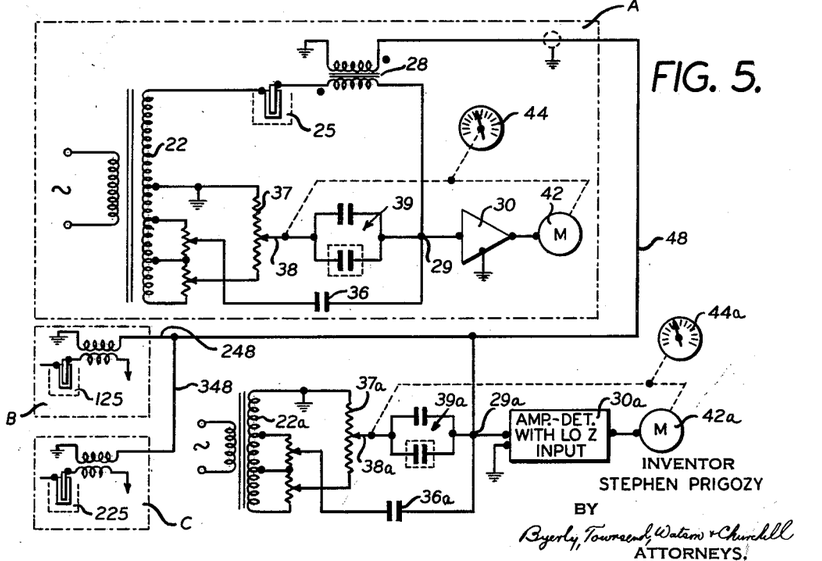
FIG. 5 is a schematic diagram showing the application of the invention wherein individual bridges each indicate the quantity of fuel in individual fuel tanks and a totalizer bridge operationally tied in with the individual bridges indicates the total quantity of fuel in all the tanks.
Figure 6:
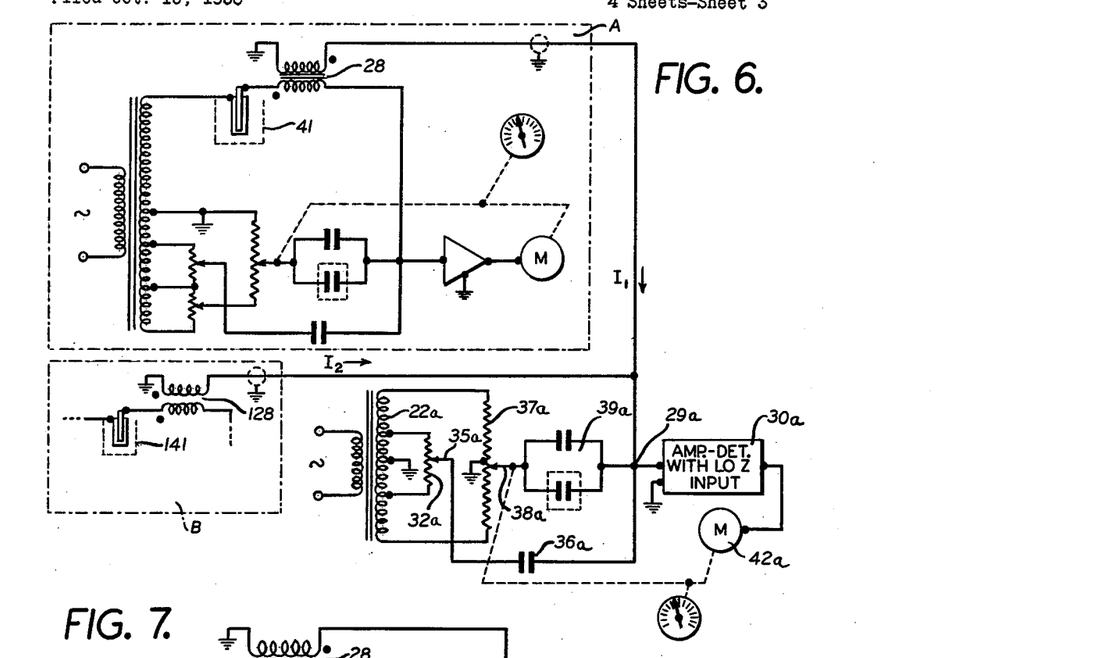
FIG. 6 is a schematic diagram showing the application of the invention in a center-of-gravity type of bridge measuring system.

FIGS. 4, 5 and 6 show other applications of the invention. FIG. 4 illustrates the practice of the invention for measuring and indicating fuel, for example, in aircraft having a plurality of fuel tanks, in this example 3 in number. In this embodiment, the totalizing bridge will measure and indicate the total weight of fuel in all the aircraft fuel tanks as the repeater bridge indicates the weight of fuel in any individual tank selected by the operator. The totalizing bridge is similar to the bridge circuit shown in FIG. 1 and thus like elements will be designated by like-numbered reference symbols. The upper half of the bridge circuit connected to the upper end of secondary winding 22 includes three separate measuring capacitors $25_1$, $25_2$, $25_3$. Each measuring capacitor is conductively in series with the primary winding of a respective pick-off transformer $28_1$, $28_2$, $28_3$. The other side of winding 27 of each pick-off transformer is conductively connected to input terminal junction 29 of amplifier 30. It will be understood that each measuring capacitor $25_1$, $25_2$, $25_3$, is suitably designed and positioned in a respective fuel tank whereby the capacitance of each measuring condenser will reflect the quantity of fuel in the tank in which it is positioned. The compensating capacitors 46 and 46a in the lower portion of the totalizer measuring bridge and in the repeater bridge will be positioned in one of the fuel tanks so that they are always immersed in fuel. Dial 44 will indicate continuously the total quantity of fuel in the three tanks because the input measuring signal to amplifier 30 from the upper portion of the totalizer will be the summation of the individual measuring signals from each of the measuring capacitors $25_1$, $25_2$, $25_3$, and will vary from a maximum when all tanks are filled to a minimum when all tanks are empty.

One side of each secondary winding 49 of the pick-off transformers $28_1$, $28_2$, $28_3$ is grounded, whereas the other side of each winding $49_1$, $49_2$, $49_3$ is conductively connected respectively, to a pair of terminal posts 50a, b, 51a, b, and 52a, b of a ganged selector switch 53. The upper turnable member 54 of selector switch 53 individually connects each terminal post 50a, 51a, 52a, one at a time, to amplifier 30a via shielded line 48. Line 48 is conductively connected to turnable member 54 at one end and input junction 29a at the other end. The lower turnable member 55 of selector switch 53 is shaped so that two of the terminals are always connected thereto as the third terminal is electrically isolated therefrom, wherein the third terminal is the one connected by the upper turnable member 54 to amplifier 30a. Lower turnable member 55 is grounded so that the secondary windings of the pick-off transformers connected thereto are shorted out through ground. If the foregoing described load requirements for the pick-off transformers are observed they will not in any appreciable sense affect the operation of the totalizer bridge circuit. Moreover, if the individual measuring condensers $25_1$, $25_2$, $25_3$ are designed to indicate identical capacitive changes in response to volumetric changes of fuel of their respective fuel tanks, and this may be accomplished by various methods, such as, profiling the measuring capacitors as known in the art, for example, see U.S. Patent 2,582,399 issued to Stanley J. Smith, January 15, 1952, or by adjusting the turns ratios of the pick-off transformers, and if the compensating capacitors 46 and 46a are immersed in fuel of similar characteristics, the repeater bridge circuit will indicate the correct weight of fuel in the tank selected by the operator. When selector switch 53 is set as shown the repeater circuit will measure the input signal from pick-off transformer $28_1$ and thus indicate the weight of fuel in the uppermost fuel tank. Individual indications of the other fuel tanks is achieved by turning selector switch 53 to its second and then third position. In the foregoing circuit it is desirable that the empty tank reference capacitance 36 equal the combined empty tank capacitances of the three measuring condensers $25_1$, $25_2$, $25_3$, whereas the capacitance of capacitor 36a equals or is adjusted to equal the empty tank capacitance of the individual measuring capacitors. Whereas the embodiments of FIG. 4 shows the practice of the invention wherein a single totalizing bridge circuit is operationally tied in with a repeater bridge circuit which indicates the quantity of fuel in any one of the individual fuel tanks as selected by the operator, FIG. 5 shows the practice of the invention wherein individual bridge circuits indicate the fuel in respective fuel tanks and the repeater simultaneously indicates the total quantity of fuel.

Block A of FIG. 5 in conjunction with the repeater bridge connected thereto by shielded line 48 is substantially the circuit shown in FIG. 1 and thus like elements are designated by like-numbered reference symbols. Measuring capacitor 25 will provide an input signal corresponding to the quantity of fuel in the fuel tank in which the capacitor is positioned. Block B is a duplication of the circuit set forth in block A and measuring capacitor 125 thereof is positioned in the second fuel tank and adapted to supply an input signal through shielded line 248 in proportion to the quantity of fuel in the second tank. Block C is also identical to the measuring circuit of block A and is adapted to indicate the quantity of fuel in a third fuel tank, wherein its input signal will be applied through shielded line 348 to junction 29a, and so on. As the bridge circuit of each block indicates individually the quantity of fuel in its respective fuel tank, the repeater bridge circuit including amplifier 30a will respond to and indicate the summation of the aforesaid signals and thus indicate total quantity of fuel in all tanks, assuming that the measuring signals from the individual measuring capacitors 25, 125, 225 are the same for change of fuel volume of their respective tanks and the fuel in the respective tanks have similar dielectric characteristics. As noted hereinbefore, the equivalent current responses may be achieved by suitably profiling the individual measuring capacitors or by regulating the respective pick-off transformer turns ratio or a combination of both.

FIG. 6 illustrates the invention employed in a center-of-gravity indicator system, that is to say, the repeater bridge circuit is adapted to indicate the unbalance caused by a greater quantity of fuel stored on one side of the aircraft center of gravity with respect to the fuel stored on the other side of center of gravity. To illustrate the circuit, two aircraft fuel tanks 41 and 141 are assumed to be on opposite sides of the aircraft center of gravity. The bridge circuit for indicating the quantity of fuel in tank 41 is shown in block A and the circuit is identical to the circuit shown in block A of FIG. 5. Consequently, like circuit elements are designated by similar reference symbols. Block B, it is assumed, contains a similar bridge circuit for measuring the quantity of fuel in the second fuel tank. Each bridge circuit also provides an induced measuring signal to junction 29a over shield lines from respective pick-off transformers 28, 128. Assuming for the moment that the center of gravity of each fuel tank is spaced equally from the aircraft center of gravity and the capacity of each tank is the same, as fuel drains equally from each tank, the signal from each individual bridge circuit should be equal but opposite in phase to cancel out so that the repeater circuit shows a balance. Accordingly, the secondary windings of pick-off transformers 28, 128 are arranged to provide signals of opposite phase with respect to each other and this is indicated by the dot symbols at the pick-off transformers. Since the repeater bridge is adapted to indicate a balance or unbalance of moment of fuel about aircraft center of gravity, repeater circuit has its secondary winding 22a grounded at its center tap, and the ends thereof are connected across potentiometer 37a also grounded at its center tap. Impedance 39a is connected from slide arm 38a to junction 29a of amplifier 30a. Potentiometer 32a is connected across the grounded center tap of secondary winding 22a. Capacitor 36a is connected to slide arm 35a to adjust the repeater bridge for balance when all the fuel tanks 41, 141 are empty. There is no need for a full adjust potentiometer although one may be applied if desired. The repeater circuit will compare the measuring signal indicating the quantity of fuel in fuel tank 41 and the distance of its center of gravity to aircraft center of gravity with that of the other tank 141 if the following relationship is followed for the turn ratios of the pick-off transformers:

$$\frac{n_1}{n_2} = \frac{d_1}{d_2} \qquad (9)$$

Where $n$ equals the turns ratio of the pick-off transformer, $d$ equals the distance from a fuel tank center of gravity to aircraft center of gravity, and the subscript 1 refers to fuel tank 41 and subscript 2 refers to fuel tank 141. Consequently, the output of each pick-off transformer is applied to amplifier 30a and is a function of the weight of the fuel in its respective tank and the distance of the tank center of gravity from aircraft center of gravity. The repeater will indicate the unbalance moment of the fuel about aircraft center of gravity. When the summation of the moments is zero, repeater circuit indicates a zero signal otherwise motor 42a is activated to move arm 38a in a direction to rebalance the bridge circuit which is an indication of the unbalanced moment of fuel about aircraft center of gravity.

Figure 7:
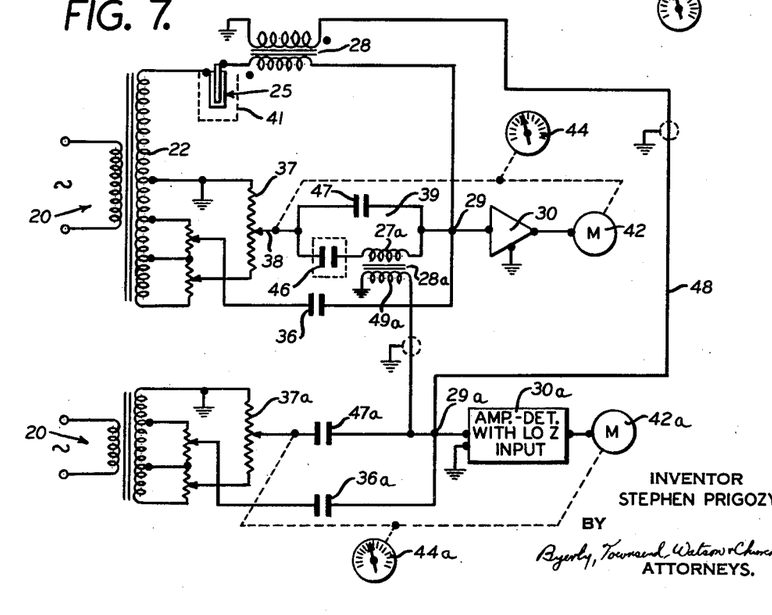
FIG. 7 is a schematic diagram showing the practice of the invention in a compensated bridge measuring system wherein the transformer is employed to duplicate the compensating reference signal.

FIG. 7 illustrates another application of the invention. The measuring bridge shown in this figure is substantially identical to that shown in FIG. 1 except that the repeater circuit does not have a compensating capacitor corresponding to 46a. The compensating reference signal is supplied by a pick-off transformer 28a which has its primary 27a conductively in series with compensating condenser 46 and junction 29. Accordingly, the circuit includes pick-off transformer 28a with its primary connected as specified hereinbefore, and a secondary winding 49a grounded at one end and electrically connected by a shielded line to junction 29a of the repeater bridge. In all other respects, the operation of the embodiment of FIG. 7 is identical to the embodiment of FIG. 1. The use of pick-off transformer 28a eliminates the compensating capacitor in the repeater circuit.

Figures 8, 8A:
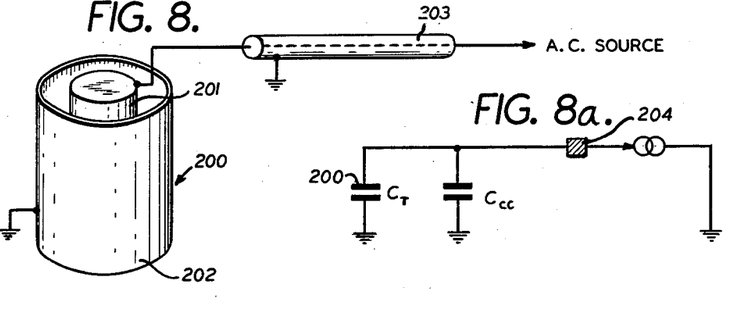
Figures 9, 9A:
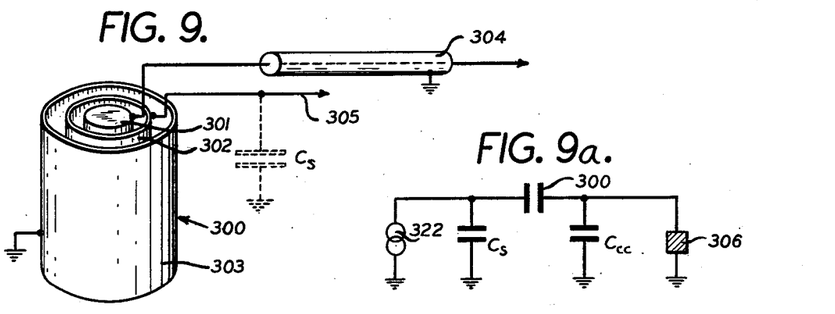
Figures 10, 10A, 11:
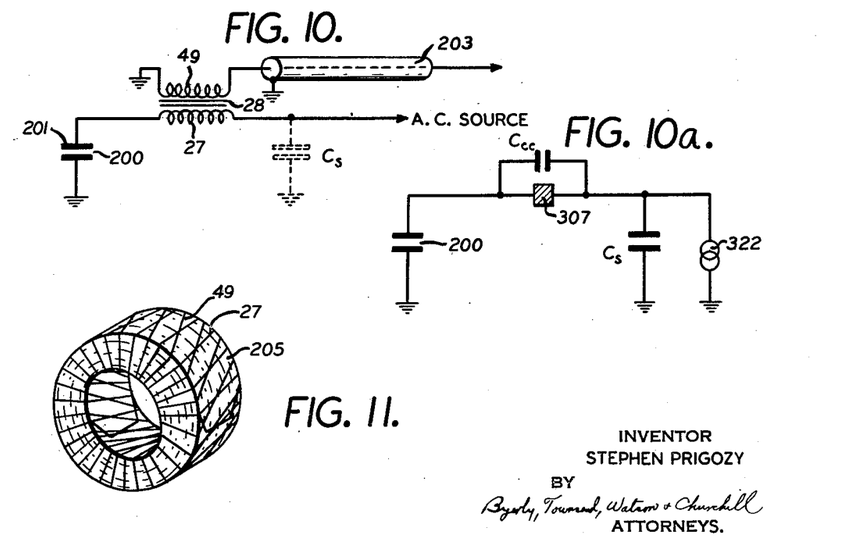
FIG. 10 shows schematically the invention as applied to the device shown in FIG. 8.
FIG. 10a shows schematically the electrical load seen by the detector in the converted system.
FIG. 11 is a perspective view depicting the core of the pick-off transformer.

FIGS. 8 through 10 illustrate the application of the invention for the purpose of converting the familiar two-wire capacitor type measuring device 200 to an equivalent three-wire capacitor type measuring device in a bridge of the type shown in FIG. 1 herein. Many aircraft still have the earlier type of measuring bridge circuit employing a two-wire capacitor measuring device. It is often desirable to convert such measuring bridge systems to the system shown in FIG. 1 and employ therewith the equivalent of the grounded three-wire capacitor measuring device but without discarding the profiled capacitor measuring tank unit already installed in the aircraft. In referring to FIG. 8a, measuring capacitor 200 has one electrode 201 conductively connected to an alternating current source via a shielded and grounded coaxial cable 203. The other electrode 202 is grounded. Since the measuring device 200 is often located in the aircraft wings, cable 203 is generally long and at a relatively high potential. Consequently, the detector-amplifier 204 of the bridge circuit sees the measuring device capacitance $C_t$ in parallel with the cable capacitance $C_{cc}$. This is depicted by the schematic FIG. 8a. Consequently, cable capacitance $C_{cc}$ affects the measuring circuit, it being essentially in parallel with the measuring capacitor 200.

FIG. 9a shows the three-wire capacitor measuring device 300 which may be employed in a bridge of the type shown in FIG. 1 and includes one electrode 301 connected by shielded line 304 to the detector-amplifier 306 and the other electrode 302 connected by cable 305 to a source of alternating current, such as secondary winding 22. The electrodes are surrounded by a grounded tube 303 which serves to remove the effects of stray capacitance. For this embodiment, the equivalent circuit seen by the detector is that shown in FIG. 9a. The stray capacitance $C_s$ is in shunt with the relatively low impedance source 322, whereas the cable capacitance $C_{cc}$ is in shunt with the relatively low impedance of the amplifier, consequently, these capacitances do not affect the measuring circuit. Electrically therefore, detector 306 is conductively in series with measuring device 300 and the source.

FIG. 10 illustrates the application of pick-off transformer 28 to the two-wire capacitor 200 of FIG. 8. Primary winding 27 is placed conductively in series with electrode 201 and the alternating current source. Secondary winding 49 is grounded at one side and by means of grounded shielded cable 203, is coupled to the low input impedance amplifier 307 for coupling the induced signal thereto. The equivalent circuit therefor is shown in FIG. 10a. Coaxial cable capacitance $C_{cc}$ shunts the relatively low impedance detector 307 whereas stray capacitance $C_s$ shunts the relatively low impedance source 322 and thus may be ignored. Consequently, the converted circuit depicted in FIG. 10a is electrically identical to that of FIG. 9a.

FIG. 11 depicts the transformer structure employed to achieve a small magnetizing current so that signal current is substantially equal to primary current necessary at the operating levels for the foregoing described bridge circuits. The transformer core 205 is wound from a continuous strip of high permeability material to form a toroidal configuration. The material used in the preferred embodiment consists of a strip .001" thick of Supermalloy. Supermalloy is a grain-oriented nickel-iron alloy of very high permeability. Reduced core losses and increased permeability are afforded by having the flux travel with the grain. In addition, the toroidal continuous strip also provides a minimum air gap and low leakage inductance. The windings 27, 49 are illustrated wound about the core. Currents flowing through the bridge circuit are of very small magnitude. Thus, a transformer of high efficiency and requiring a low magnetizing current as contemplated herein is desired. The turns ratio of transformer 28 is 1:1 although as noted hereinbefore other ratios may be used. Although the invention has been shown in conjunction with capacitor type measuring device, it should be understood that the invention may be used in conjunction with other high impedance transducers.

Since many changes of this invention could be made without departing from the scope thereof, it is intended that all matter contained in the above description or shown in the accompanying drawings shall be interpreted as illustrative and not in a limiting sense.

As used in the appended claims, reference to an "arm" of the bridge circuit is intended to encompass any portion of the circuit in which the current is at least substantially fixed in phase during operation.

What is claimed is:

1. Apparatus for measuring a characteristic of a dielectric material comprising, a first bridge circuit responding to a signal furnished by transducer measuring means coupled in an arm thereof which means has an impedance which is at least a function of the dielectric constant of said material, a second bridge circuit including signal responsive means having a relatively low input impedance, means for supplying said first and second bridge circuits with energizing alternating current voltage of like phase, and transformer means having a primary winding connected in said arm of said first bridge circuit conductively in series with said transducer measuring means and also having a secondary winding included in an arm of said second bridge circuit so as to couple an induced signal to said signal responsive means, said transducer measuring means being characterized by a relatively high impedance in comparsion to a low impedance which is reflected by said secondary winding into said primary winding, said transformer being characterized by a low loss core of high permeability material and low coercive force such that the current required in the primary winding to balance the secondary load current is substantially equal to the total primary winding current due to said signal furnished by said transducer means.

2. Apparatus for measuring a characteristic of a dielectric material comprising, a first bridge circuit responding to a signal furnished by transducer measuring means coupled in an arm thereof which means has an impedance which is at least a function of the dielectric constant of said material, a second bridge circuit including signal responsive means having a relatively low input impedance, means for supplying said first and second bridge circuits with energizing alternating current voltage of like phase, and transformer means having a primary winding connected in said arm of said first bridge circuit conductively in series with said transducer measuring means and also having a secondary winding included in an arm of said second bridge circuit so as to couple an induced signal to said signal responsive means, said transducer measuring means being characterized by a relatively high impedance in comparison to a low impedance which is reflected by said secondary winding into said primary winding.

3. In apparatus including a first continually rebalancing bridge for measuring the quantity of dielectric fuel in a fuel tank wherein a measuring signal furnished by transducer measuring means included in an arm of said first bridge which means has an impedance which is a function of both the height of fuel in said fuel tank and the fuel dielectric constant is compared to a reference signal furnished by first impedance reference means included in said first bridge so that the resultant signal is used to restore the first bridge to balance and the degree of correction required for rebalancing the first bridge is an indication of the change in impedance of the measuring transducer the combination comprising, a second fuel measuring bridge including a signal responsive means having a relatively low input impedance, coupling means for supplying said first and second bridges with energizing alternating current voltage of like phase, transformer means having a primary winding connected in said arm of said first bridge conductively in series with said transducer measuring means and also having a secondary winding included in an arm of said second bridge so as to couple an induced measuring signal of predetermined phase and which is a function of the impedance of said transducer means to said signal responsive means, said transducer means being characterized by a relatively high impedance in comparison to a low impedance which is reflected by said secondary winding into said primary winding, second impedance reference means included in said second bridge and coupled to said signal responsive means, said second impedance reference means being coupled to said coupling means for supplying when energized a reference signal of predetermined phase and magnitude to said signal responsive means, and means coupled thereto responsive to said signal responsive means for varying the reference signal furnished by said second reference impedance means wherein the resultant input signal to said signal responsive means is reduced substantially to zero, whereby the degree of correction required to restore the second bridge to balance is an indication of the change in impedance of said transducer measuring means.

4. Apparatus as defined in claim 3 wherein said transformer means comprises a low loss core of high permeability material and low coercive force such that said transformer in operation will draw a small magnetizing current and have small core loss, said transformer having a one-to-one turns ratio, whereby said induced measuring signal is substantially equal to the measuring signal furnished by said transducer.

5. Apparatus as defined in claim 3 wherein said transducer measuring means comprises a capacitor type measuring device having spaced electrodes for positioning in said fuel tank such that the space between its electrodes is filled to the level of fuel in said fuel tank, and wherein said transformer means comprises a low loss core of high permeability material and low coercive force so that said transformer in operation will draw a small magnetizing current and have a small core loss, whereby the transformer primary winding current required to balance the secondary load current is substantially equal to the total primary winding current due to the measuring signal furnished by said transducer.

6. Apparatus as defined in claim 3 wherein said second impedance reference means comprises second transformer means having a primary winding connected in another arm of said first bridge conductively in series with at least a portion of said first impedance reference means and also having a secondary winding included in another arm of said second bridge so as to couple an induced reference signal to said signal responsive means, said portion of said first impedance reference means being characterized by a relatively high impedance in comparison to a low impedance reflected into the primary winding of said second transformer means by the secondary winding thereof.

7. Apparatus for measuring the quantity of dielectric fuel in a fuel tank comprising, a first bridge circuit responding to a signal furnished by a capacitor type measuring means coupled in an arm thereof which means has spaced electrodes adapted to be immersed in said fuel, said means having a capacitance which is a function of both the level of dielectric fuel between its spaced electrodes and the fuel dielectric constant, a second bridge circuit including signal responsive means having a relatively low input impedance, means for supplying said first and second bridge circuits with energizing alternating current voltage of like phase, and transformer means having a primary winding connected in said arm of said first bridge circuit conductively in series with said measuring means and also having a secondary winding included in an arm of said second bridge circuit so as to couple an induced signal to said signal responsive means, said measuring means being characterized by a relatively high impedance in comparison to a low impedance which is reflected by said secondary winding into said primary winding, said transformer being characterized by a low loss core of high permeability material and low coercive force such that the current required in the primary winding to balance the secondary winding load current is substantially equal to the total primary winding current due to the signal furnished by said capacitor means.

8. Apparatus for measuring the quantity of dielectric fuel in at least one fuel tank comprising, a capacitor type measuring means having spaced electrodes adapted to be immersed in the fuel in said one tank and having a capacitance which is a function of both the level of fuel in said one fuel tank and the fuel dielectric constant, means for coupling a source of energizing alternating current voltage to said measuring means to provide a first circuit for causing the measuring means to provide a measuring signal, a bridge circuit including signal responsive means having a relatively low input impedance, means for coupling said bridge circuit to a source of energizing alternating current voltage, a transformer means having a primary winding connected in said first circuit conductively in series with said capacitor measuring means and also having a secondary winding included in a second circuit in said bridge circuit so as to couple an induced measuring signal to said signal responsive means, said first circuit being characterized by a relatively high impedance in comparison to a low impedance which characterizes said second circuit, said transformer also being characterized by a low loss core of high permeability material and low coercive force whereby, the induced measuring signal is also a function of the capacitance of said capacitor measuring means.

9. Apparatus as defined in claim 8 further comprising, a second capacitor type measuring means having spaced electrodes adapted to be immersed in the fuel in a second fuel tank and having an impedance which is a function of both the level of fuel in said second fuel tank and the fuel dielectric constant, means for coupling a source of energizing alternating current voltage to said second measuring means to provide a third circuit for causing the second measuring means to provide a second measuring signal, a second transformer means having its primary winding connected in said third circuit conductively in series with said second measuring means and also having a secondary winding included in a fourth circuit in said bridge circuit so as to couple a second induced measuring signal to said signal responsive means, said third circuit being characterized by a relatively high impedance in comparison to a low impedance which characterizes said fourth circuit, and said second transformer means also being characterized by a low loss core of high permeability material and low coercive force whereby, the second induced measuring signal is a function of the capacitance of said second capacitor type measuring means.

10. Apparatus as defined in claim 9 further comprising switch means for alternatively conductively connecting individual ones of said transformer secondary windings to said signal responsive means and electrically shorting out individual ones of the other secondary windings.

11. Apparatus for measuring the quantity of dielectric fuel in a plurality of fuel tanks comprising, a totalizer bridge circuit responding to the summation of measuring signals furnished by a plurality of capacitor type measuring means coupled therein which means each have spaced electrodes adapted to be immersed in individual fuel tanks and a capacitance which is a function of both the level of the fuel in the respective fuel tank and the fuel dielectric constant; said totalizer bridge including a first signal responsive device coupled to said measuring means for receiving the summation of said measuring signals, and impedance reference means coupled thereto for coupling a reference signal to said first signal responsive device to be compared with the summation of said measuring signals received by said device; a second bridge circuit including a second signal responsive device having a relatively low input impedance; means for coupling said totalizer bridge circuit and said second bridge circuit to a source of energizing alternating current voltage; a plurality of transformer means each having a primary winding connected in a respective circuit of said totalizer bridge conductively in series with both the input to said first signal responsive device and a respective one of said capacitor type measuring means and each transformer means also having a secondary winding for providing an induced measuring signal, means for selectively coupling individual ones of said secondary windings into a circuit in said second bridge circuit coupled to said second signal responsive device for supplying an induced measuring signal thereto and electrically shorting the other of said secondary windings, second impedance reference means included in said second bridge circuit for coupling a reference signal to said second signal responsive device for comparison with the induced signal coupled thereto, the circuit including the primary winding of each transformer being characterized by a relatively high impedance in comparison to a low impedance which characterizes the circuit including its secondary winding and said transformers also being characterized by a low loss core of high permeability material and low coercive force, said first signal responsive device being adapted to respond to the resultant of the summation of the individual measuring signals as compared to the reference signal applied thereto, and the second signal responsive device being adapted to respond to the resultant of the selected induced measuring signal as compared to the reference signal applied thereto.

12. Apparatus as defined in claim 11 further comprising, means responsive to any one of said signal responsive devices for varying the reference signal applied to such device such that the resultant signal to such device is reduced substantially to zero.

13. Apparatus for measuring the quantity of dielectric fuel in a plurality of fuel tanks comprising individual measuring bridges for respective ones of said fuel tanks, each of said measuring bridges including: a bridge circuit responding to a measuring signal furnished by a capacitor measuring means coupled therein which means has spaced electrodes adapted to be immersed in a corresponding fuel tank, said capacitor means having a capacitance which is a function of both the level of fuel in its corresponding fuel tank and the fuel dielectric constant, a signal responsive device coupled to said measuring means for receiving said measuring signal, impedance reference means coupled thereto for coupling a reference signal to said signal responsive device to be compared with said measuring signal, the input signals to said signal responsive device being the resultant of the signals applied thereto, and transformer means having a primary winding connected in a circuit conductively in series with both the input to the signal responsive device and said capacitor measuring means; a totalizer bridge circuit having a signal responsive device of relatively low input impedance, and impedance reference means coupled therein for coupling a reference signal to said last-mentioned signal responsive device; said transformer means of each of said measuring bridges each having a secondary winding included in a circuit in said totalizer bridge circuit so as to couple an induced measuring signal to said last-mentioned signal responsive device such that the summation of the individual induced measuring signals from all the secondary windings is compared with the reference signal of the last-mentioned impedance reference means, the circuits containing the primary winding of each of said transformer means being characterized by a relatively high impedance in comparison to a low impedance which characterizes the circuit containing the secondary windings, said transformers also being characterized by a low loss core of high permeability material and low coercive force; and means for coupling all of said bridge circuits to a source of energizing alternating current voltage, the signal responsive device of each measuring bridge circuit being adapted to respond to the measuring signal from its respective capacitor measuring means as compared to the reference signal applied thereto by its respective impedance reference means, and the signal responsive device of said totalizer bridge circuit being adapted to respond to the resultant of the summation of the induced measuring signals applied thereto as compared to the reference signal applied thereto by its respective impedance reference means.

14. Apparatus as defined in claim 13 wherein, any one of said bridge circuits further includes means coupled thereto responsive to its respective signal responsive device for varying the reference signal applied thereto such that the resultant input signal to such signal responsive device is reduced substantially to zero.

15. Apparatus as defined in claim 13 for indicating the balance and unbalance of moment of fuel about aircraft center of gravity, said fuel tanks being disposed on opposite sides of center of gravity of an aircraft and the distance between the center of gravity of said fuel tanks with respect to aircraft center of gravity being known, characterized in that said transformer means having primary windings included in measuring bridge circuits for fuel tanks on one side of aircraft center of gravity have their corresponding secondary windings connected to provide induced measuring signals of predetermined and like phase relationship to said totalizer bridge circuit signal responsive device, and said transformer means having primary windings included in measuring bridge circuits for fuel tanks on the other side of aircraft center of gravity have their secondary windings connected to provide induced measuring signals to said totalizer bridge circuit signal responsive device of phase relationship opposite to said predetermined phase, the turns ratios of individual ones of said transformer means being selected such that the corresponding transformers furnish induced measuring signals in proportion to the distance between center of gravity of their corresponding fuel tanks from aircraft center of gravity whereby, the summation of the induced measuring signals applied to the totalizer bridge circuit signal responsive device is zero when the total moment of aircraft fuel is zero.

16. Apparatus as defined in claim 15 further including, means responsive to said totalizer bridge circuit signal responsive device for varying the reference signal applied thereto, wherein the resultant of the signals to said totalizer bridge circuit signal responsive device is reduced substantially to zero and the degree of correction required to restore the totalizer bridge circuit to balance is an indication of unbalance of moment of fuel.

17. Apparatus for measuring a physical property of material comprising, a bridge circuit responding to a signal current furnished by transducer measuring means having an impedance which is a function of the dielectric constant of said material, means for coupling said measuring means and said bridge circuit to a source of energizing alternating current voltage, signal responsive means included in said bridge circuit having a relatively low input impedance, and transformer means having a primary winding connected in a first circuit conductively in series with said transducer means and also having a secondary winding included in a second circuit in said bridge circuit so as to couple an induced signal to said signal responsive means, said first circuit being characterized by a relatively high impedance in comparison to a low impedance which characterizes said second circuit, said transformer also being characterized by a low loss core of high permeability material and low coercive force such that the current required in the primary winding to balance the secondary load current is substantially equal to the total primary winding current due to said signal current furnished by said transducer means.

18. Apparatus for measuring dielectric fuel in a tank comprising, a measuring bridge responding to a measuring signal furnished by capacitor type measuring means having spaced electrodes adapted to be positioned in said fuel tank such that its capacitance is a function of both the level of fuel between its electrodes and the dielectric constant of said fuel, means for coupling said measuring means and said measuring bridge to a source of energizing alternating current voltage, a signal responsive device included in said measuring bridge having a relatively low input impedance, transformer means having a primary winding connected in a first circuit conductively in series with said capacitor type measuring means and also having a secondary winding included in a second circuit in said measuring bridge so as to couple an induced signal to said signal responsive device, said first circuit being characterized by a relatively high impedance in comparison to a low impedance which characterizes said second circuit, said transformer also being characterized by a low loss core of high permeability material and low coercive force, and impedance reference means included in said measuring bridge for coupling a reference measuring signal to said signal responsive device wherein, the input to said signal responsive device being the resultant of the induced measuring signal as compared to the reference signal applied thereto.

19. Apparatus as defined in claim 18 further comprising, means connected to said signal responsive device and responsive thereto for varying the reference signal applied thereto such that the resultant input signal to said signal responsive device is reduced substantially to zero and the degree of correction required to restore the measuring bridge to balance is an indication of the change in capacitance of said capacitor type measuring means.

20. Apparatus for obtaining the advantages of a three-wire system from a two wire capacitor device having a pair of electrodes separated by a space for immersion in a material so as to have an impedance which is at least a function of the dielectric constant thereof, comprising in combination therewith, a transformer characterized by high permeability, a low loss core, low coercive force, and close coupling between primary and secondary windings, said transformer being disposed in close physical proximity to said capacitor device with the primary winding connected conductively in series between one side of a source of alternating current and one of said electrodes, the other side of said source and the other electrode being grounded, and the secondary winding of said transformer being connected between ground and the ungrounded input of an amplifier detector means characterized by a low input impedance with respect to the relatively high impedance of said capacitor device.

References Cited in the file of this patent
UNITED STATES PATENTS

| | | |
|---|---|---|
| 2,896,454 | Storm et al. | July 28, 1959 |
| 2,940,311 | Storm et al. | June 14, 1960 |